United States Patent
Li

(10) Patent No.: US 10,427,872 B2
(45) Date of Patent: Oct. 1, 2019

(54) AUTOMATIC WAREHOUSE CONTROL SYSTEM AND METHOD

(71) Applicant: SHENZHEN WHALEHOUSE TECHNOLOGY COMPANY LIMITED, Shenzhen (CN)

(72) Inventor: Linzi Li, Shenzhen (CN)

(73) Assignee: Shenzhen Whalehouse Technology Company Limited, Guangdong (CN)

( * ) Notice: Subject to any disclaimer, the term of this patent is extended or adjusted under 35 U.S.C. 154(b) by 0 days.

(21) Appl. No.: 15/499,122

(22) Filed: Apr. 27, 2017

(65) Prior Publication Data
US 2017/0225892 A1 Aug. 10, 2017

Related U.S. Application Data

(63) Continuation of application No. PCT/CN2014/089610, filed on Oct. 27, 2014.

(51) Int. Cl.
*B65G 1/137* (2006.01)
*G06K 17/00* (2006.01)
(Continued)

(52) U.S. Cl.
CPC ............. *B65G 1/1378* (2013.01); *B65G 1/10* (2013.01); *B65G 1/1373* (2013.01);
(Continued)

(58) Field of Classification Search
CPC ...... B65G 1/10; B65G 1/1376; B65G 1/1378; G05D 2201/0216
See application file for complete search history.

(56) References Cited

U.S. PATENT DOCUMENTS

| | | | |
|---|---|---|---|
| 2,999,579 | A | 9/1961 | Kostrzewa |
| 3,221,781 | A | 12/1965 | Forsström |

(Continued)

FOREIGN PATENT DOCUMENTS

| | | |
|---|---|---|
| CN | 2654552 | 11/2004 |
| CN | 201233608 Y | 5/2009 |

(Continued)

OTHER PUBLICATIONS

International Search Report and Written Opinion for Application No. PCT/CN2014/089610 dated Feb. 11, 2015 (8 pages).

*Primary Examiner* — Thomas Randazzo
(74) *Attorney, Agent, or Firm* — Michael Best & Friedrich LLP

(57) ABSTRACT

An automatic warehouse control system and method are provided. The system comprises a goods transport module, an information input module, a data storage module, a data retrieval module, and a drive control module. The goods transport module moves goods containers. The information input module is configured to input goods information to form goods warehousing data. The data storage module stores the goods warehousing data. The data retrieval module retrieves goods warehousing data and sends a retrieved result to the drive control module according to information of to-be-picked goods. The drive control module controls operation of the goods transport module to transport a goods container containing the to-be-picked goods to the goods-picking location according to the retrieved result. The technical solution is easy to implement, has a low cost, and allows one warehouse operator to manage multiple racks at the same time, which can significantly reduce hardware and time cost.

8 Claims, 2 Drawing Sheets

(51) Int. Cl.
*G06Q 10/08* (2012.01)
*B65G 1/10* (2006.01)

(52) U.S. Cl.
CPC ....... *B65G 1/1376* (2013.01); *G06K 17/0022* (2013.01); *G06Q 10/08* (2013.01); *G06Q 10/087* (2013.01); *G05D 2201/0216* (2013.01)

(56) References Cited

U.S. PATENT DOCUMENTS

| | | | |
|---|---|---|---|
| 3,432,044 A | 3/1969 | Stienen | |
| 3,662,905 A | 5/1972 | Mizuno et al. | |
| 3,809,208 A | 5/1974 | Shields | |
| 3,860,130 A * | 1/1975 | Frangos | E04H 6/187 414/237 |
| 4,492,504 A * | 1/1985 | Hainsworth | B66F 9/07 414/273 |
| 4,710,122 A | 12/1987 | Villanueva | |
| 4,972,937 A | 11/1990 | Aarts | |
| 5,012,917 A * | 5/1991 | Gilbert | B62D 65/18 198/465.1 |
| 5,065,872 A | 11/1991 | Simon | |
| 5,090,552 A | 2/1992 | Fukuyama et al. | |
| RE34,016 E | 8/1992 | Hankes | |
| 5,205,026 A | 4/1993 | Sticht | |
| 5,207,335 A | 5/1993 | Voelz | |
| 6,059,229 A | 5/2000 | Luria | |
| 6,202,359 B1 | 3/2001 | Reed | |
| 6,748,292 B2 * | 6/2004 | Mountz | G05D 1/0274 700/214 |
| 6,895,301 B2 * | 5/2005 | Mountz | G05D 1/0274 700/113 |
| 6,950,722 B2 * | 9/2005 | Mountz | G05D 1/0274 700/113 |
| 7,751,928 B1 * | 7/2010 | Antony | G06Q 10/087 700/214 |
| 7,826,919 B2 * | 11/2010 | D'Andrea | B66F 9/063 700/214 |
| 7,974,891 B2 * | 7/2011 | Shakes | G06Q 10/0875 705/28 |
| 8,244,603 B1 * | 8/2012 | Tang | G06Q 10/087 705/28 |
| 8,666,536 B2 * | 3/2014 | Freudelsperger | B65G 1/1378 700/214 |
| 8,731,708 B2 * | 5/2014 | Shakes | G06Q 10/08 700/216 |
| 8,952,284 B1 * | 2/2015 | Wong | B07C 5/3412 209/586 |
| 9,037,286 B2 * | 5/2015 | Lert | B65G 1/1378 700/216 |
| 9,114,748 B1 * | 8/2015 | Blatstein | B60P 1/36 |
| 9,120,621 B1 * | 9/2015 | Curlander | G06Q 10/087 |
| 9,280,756 B2 * | 3/2016 | Hara | G05B 15/02 |
| 9,346,619 B1 * | 5/2016 | O'Brien | B65G 1/1371 |
| 9,436,184 B2 * | 9/2016 | D'Andrea | B66F 9/063 |
| 9,519,882 B2 * | 12/2016 | Galluzzo | B25J 5/007 |
| 9,694,976 B1 * | 7/2017 | Wurman | G06Q 10/087 |
| 2003/0057058 A1 * | 3/2003 | Iwasa | B65B 5/064 198/419.3 |
| 2006/0102529 A1 * | 5/2006 | Wilke | B07C 3/082 209/584 |
| 2008/0183326 A1 * | 7/2008 | Danelski | B65G 1/1376 700/215 |
| 2011/0130869 A1 * | 6/2011 | Linge | B65G 1/1378 700/218 |
| 2012/0101627 A1 * | 4/2012 | Lert | B65G 1/1378 700/216 |
| 2012/0181151 A1 * | 7/2012 | Ishino | B65G 17/12 198/842 |
| 2012/0186950 A1 * | 7/2012 | Ishino | A47F 10/06 198/850 |
| 2013/0253697 A1 * | 9/2013 | Issing | B65G 1/1376 700/214 |
| 2013/0310967 A1 * | 11/2013 | Olson | G06Q 10/087 700/214 |
| 2014/0350715 A1 * | 11/2014 | Gopalakrishnan | G06Q 10/087 700/215 |
| 2015/0012396 A1 * | 1/2015 | Puerini | G06Q 10/0875 705/28 |
| 2016/0107838 A1 * | 4/2016 | Swinkels | B66F 9/063 414/273 |
| 2016/0129587 A1 * | 5/2016 | Lindbo | B65G 1/1378 700/218 |
| 2016/0229631 A1 * | 8/2016 | Kimura | G05D 1/0291 |
| 2016/0229634 A1 * | 8/2016 | Yamashita | B65G 1/1378 |
| 2016/0236869 A1 * | 8/2016 | Kimura | G05D 1/0291 |
| 2017/0225890 A1 | 8/2017 | Li | |

FOREIGN PATENT DOCUMENTS

| | | |
|---|---|---|
| CN | 101446824 | 6/2009 |
| CN | 101814204 A | 8/2010 |
| CN | 101866448 A | 10/2010 |
| CN | 102930416 A | 2/2013 |
| CN | 103714441 A | 4/2014 |
| CN | 103824171 A | 5/2014 |
| CN | 102633077 | 6/2014 |
| CN | 103359442 | 10/2015 |
| DE | 3913651 A1 | 10/1990 |
| DE | 10015329 A1 | 10/2001 |
| DE | 10032397 A1 | 1/2002 |
| DE | 2744539 | 11/2004 |
| EP | 0339136 A1 | 11/1989 |
| EP | 0675059 A2 | 10/1995 |
| JP | 58139902 A | 8/1983 |
| JP | 01288524 A | 11/1989 |
| JP | 03096577 A | 4/1991 |
| JP | H08295407 | 11/1996 |
| JP | 2005170607 A | 6/2005 |
| JP | 2007021629 A | 2/2007 |
| JP | 2007050988 A | 3/2007 |
| JP | 20027216340 | 8/2007 |

* cited by examiner

AUTOMATIC WAREHOUSE CONTROL SYSTEM AND METHOD

FIELD

The present invention relates to the field of warehouse system management and, in particular, to a system and a method for controlling an automatic warehouse.

BACKGROUND

Currently, three-dimensional warehouses are commonly used in warehouse management in the storage and logistics field. That is, a plurality of racks is arranged, and goods are picked and placed by workers or by stackers moving back and forth along an aisle. This type of warehouse management has a poor efficiency and is inconvenient to use.

An automatic warehouse system with mobile racks was proposed in the prior art, in which a rack is transported by a robot to a fixed working window for loading and unloading goods, and is then transported back by the robot. However, this warehouse management imposes an over-high requirement on the hardware. In order to transport the rack and goods to a designated position under the system control, the robot must be equipped with devices such as optical sensors and infra-red sensors, and must be capable of autonomously avoiding obstacles and finding the path to the designated position. In practice, this management can hardly be implemented and leads to a high cost of purchasing the hardware. In addition, space needs to be left in the racks for movement of the robot and goods containers, which may reduce the density of the goods container arrangement.

Therefore, there is a need for an automatic dense warehouse apparatus that has a low cost and can be conveniently managed.

SUMMARY

Accordingly, the present invention provides an automatic warehouse control system that has a low cost and is easy to manage.

An automatic warehouse control system comprises a goods transport module, an information input module, a data storage module, a data retrieval module, and a drive control module. The goods transport module is configured to move goods containers. The information input module is configured to input goods information to form goods warehousing data when the goods are loaded into the goods containers. The data storage module is configured to store the goods warehousing data. The data retrieval module is configured to retrieve goods warehousing data and send a retrieved result to the drive control module according to information of to-be-picked goods. The drive control module is configured to control operation of the goods transport module to transport a goods container containing the to-be-picked goods to the goods-picking location according to the retrieved result.

In one embodiment, the goods transport module includes a rack, a plurality of goods containers supported on the rack, and a container driving device configured to push the goods containers for circulation movement on the rack.

In one embodiment, the information input module comprises a barcode or RFID scanner.

In one embodiment, each of the goods containers has a unique container code, and a correspondence relationship is established between the goods information and the container code.

In one embodiment, the drive control module includes a switch, and when the switch is turned on, the container driving device operates to push the containers to move.

In one embodiment, a specific process of operation of the drive control module comprises:
  determining a container code of a goods container containing the to-be-picked goods and a current distance of the goods container containing the to-be-picked goods to the goods-picking location;
  determining a specific time or a specific number of movement steps needed for the goods container containing the to-be-picked goods to move to the goods-picking location according to the distance;
  turning on the switch, and after a lapse of the specific time or the specific number of movement steps, turning off the switch.

In one embodiment, the automatic warehouse comprises a plurality of racks, and the drive control module comprises a plurality of switches corresponding to the racks.

An automatic warehouse control method includes the following steps:
  step a: inputting goods information to form goods warehousing data when the goods are loaded into the goods containers;
  step b: storing the goods warehousing data;
  step c: retrieving goods warehousing data according to information of to-be-picked goods.
  step d: transporting a goods container containing the to-be-picked goods to a goods-picking location according to a retrieved result.

In one embodiment, the automatic warehouse includes a rack, a plurality of goods containers supported on the rack, and a container driving device configured to push the goods containers for circulation movement on the rack.

In one embodiment, the step d further comprises:
  determining a container code of the goods container containing the to-be-picked goods and a current distance of the goods container containing the to-be-picked goods to the goods-picking location;
  determining a specific time or a specific number of movement steps needed for the goods container containing the to-be-picked goods to move to the goods-picking location according to the distance;
  switching on the container driving device, and after a lapse of the specific time or the specific number of movement steps, switching off the container driving device.

The technical solution of the above embodiments of this invention is easy to implement, has a low cost, and allows one warehouse operator to manage multiple racks at the same time, which can significantly reduce hardware and time cost for warehouse management.

DESCRIPTION OF THE EMBODIMENTS

In order to make the objective, technical solution and advantages of the present invention become more apparent, the present invention is described below in detail with reference to accompany drawings and embodiments. It is to be understood that the specific embodiments described herein are for the purposes of illustration only and are not intended to limit the present invention.

Figure 1:
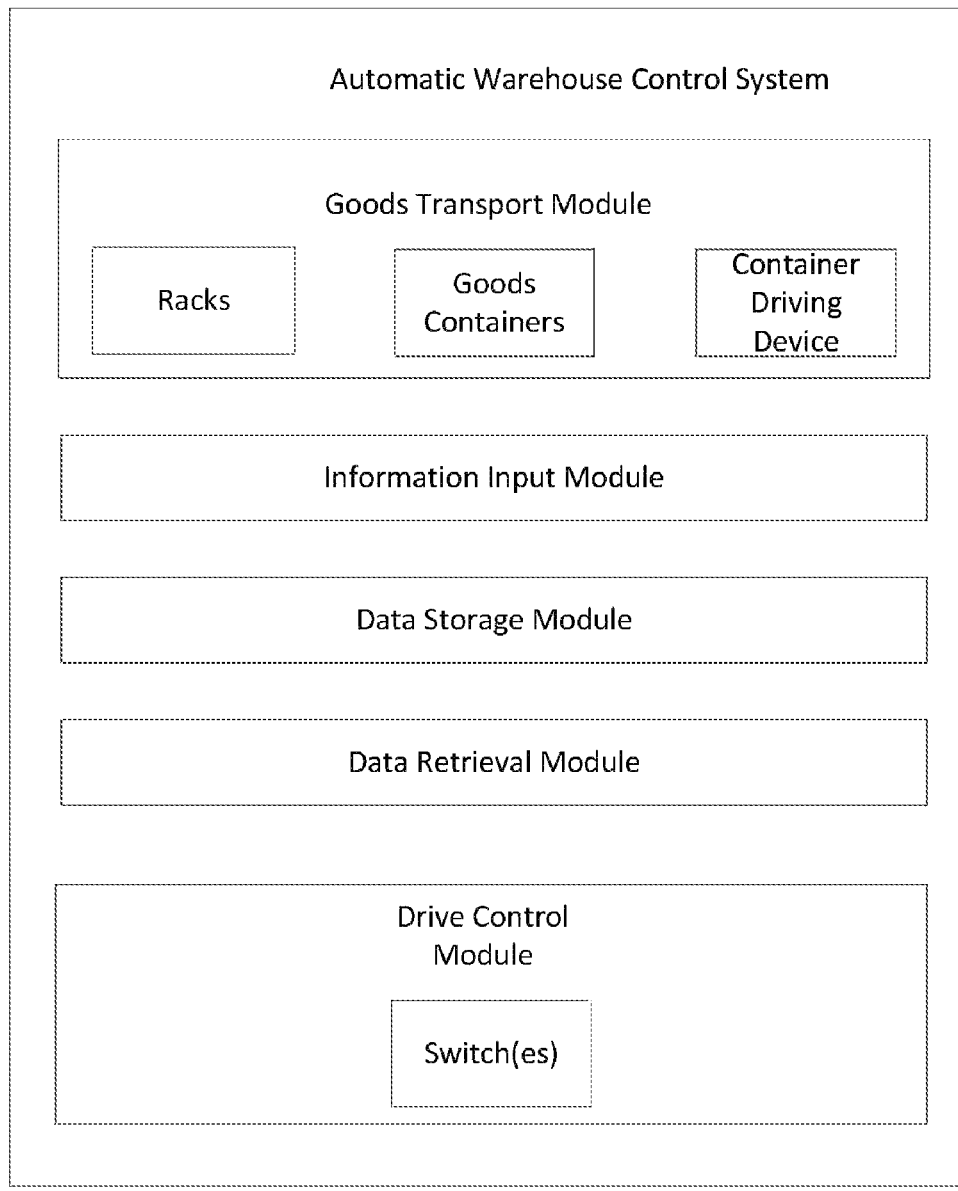
FIG. 1 is a block diagram of an automatic warehouse control system of the present invention.

Referring to FIG. 1, the automatic warehouse control system of the present invention generally includes a goods transport module, an information input module, a data storage module, a data retrieval module, and a drive control module.

The goods transport module is configured to move goods containers, which includes a rack and a plurality of goods containers supported on the rack. The goods containers are used to contain goods therein and are capable of circulation movement on the rack. The goods transport module further includes a container driving device. In a preferred embodiment of the present invention, the container driving device is implemented as a push rod driven by a pneumatic cylinder. The driving device pushes a goods container in contact with the driving device to move, and this goods container when moving in turn pushes a goods container in front of this goods container to move, such that the goods containers are moved circulatingly as a whole on the rack.

The rack defines a fixed goods-picking location for a user to pick goods, and the goods-picking location is located on a movement path of the goods containers.

The information input module is configured to input goods information to form goods warehousing data when the goods are loaded into the goods containers.

The goods information includes goods names, model numbers, batch numbers, and the like. In a preferred embodiment of the present invention, the information input module includes a barcode or RFID scanner for conveniently obtaining the goods information when the goods are put into the goods containers. Each of the goods containers of the automatic warehouse has a unique container code. Once the goods are put into a goods container and the goods information are inputted, a correspondence relationship is established between the goods information and the container code, thereby forming the goods warehousing data.

The data storage module is configured to store the goods warehousing data of the automatic warehouse.

The data retrieval module is configured to retrieve goods warehousing data in the data storage module and send a retrieved result to the drive control module according to information of to-be-picked goods.

The drive control module is configured to control operation of the goods transport module to transport the goods container containing the to-be-picked goods to the goods-picking location, according to the retrieved result sent from the data retrieval module.

In a preferred embodiment of the present invention, the drive control module includes a switch. When the switch is turned on, the container driving device operates. In particular, the drive control module determines the container code of a goods container containing the to-be-picked goods and a current distance of the goods container containing the to-be-picked goods to the goods-picking location according to the retrieved result sent from the data retrieval module. In the goods transport module of the present invention, movement of the goods containers has a constant speed. Therefore, according to the distance of the goods container containing the to-be-picked goods to the goods-picking location, the drive control module is able to calculate a time T needed for the goods container containing the to-be-picked goods to move to the goods-picking location. In one embodiment, the goods containers move in a stepping manner, with a length of each movement step equal to a length of one container space. As such, the current distance of the goods container containing the to-be-picked goods to the goods-picking location can be determined in terms of the number of the container spaces and, therefore, whether the goods container containing the to-be-picked goods has been moved to the goods-picking location can be determined by determining the number of movement steps of the goods container.

When the above retrieved result is received, the switch of the drive control module is turned on to control the container driving device to operate, such that the goods container containing the to-be-picked goods starts moving toward the goods-picking location. After a lapse of time T or the determined number of movement steps, the switch of the drive control module is turned off. At this time, the goods container containing the to-be-picked goods has been moved to the goods-picking location, and the user can thus pick goods.

In an alternative embodiment of the present invention, a plurality of the racks is arranged, and the drive control module includes a plurality of switches corresponding to the racks to form a switch array.

Figure 2:
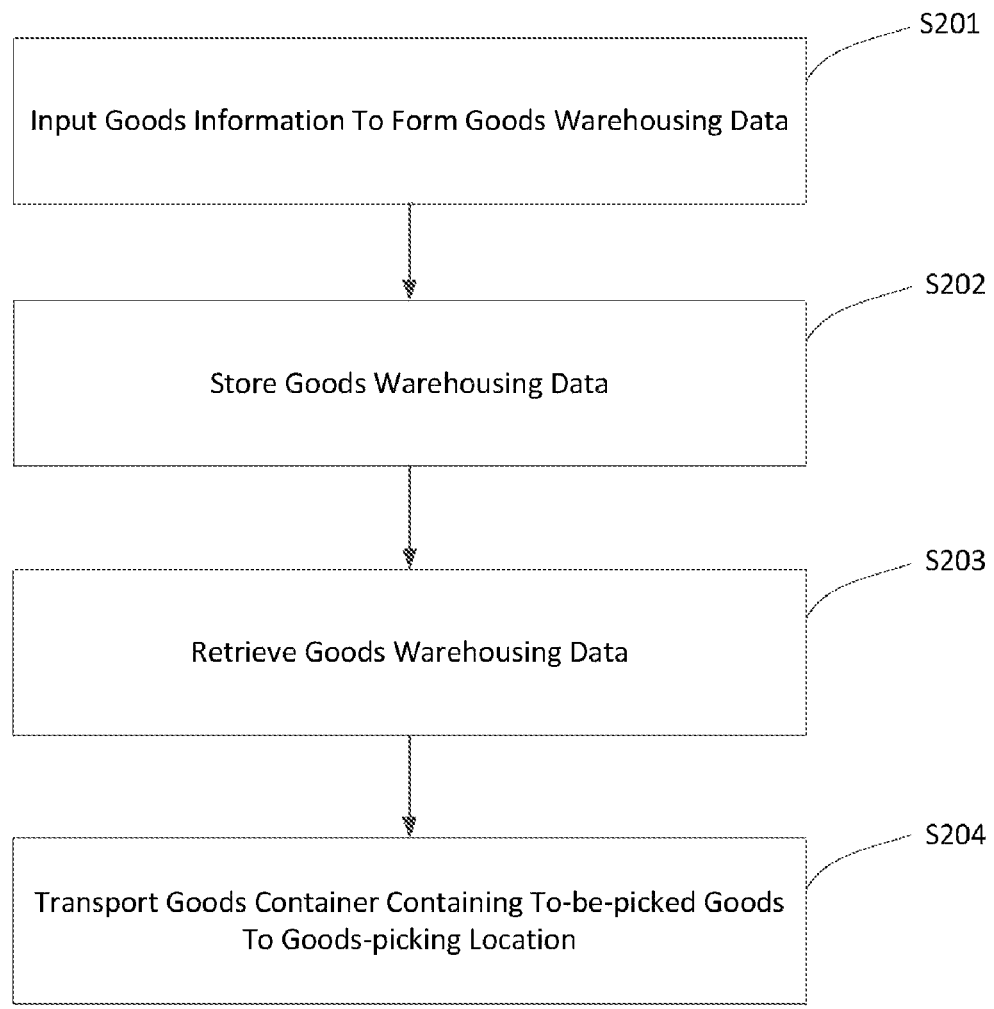
FIG. 2 is a flow chart of an automatic warehouse control method of the present invention.

The automatic warehouse control system further includes an information feedback module for detecting operation of the goods transport module and updating the goods warehousing data in the data storage module according to the operation of the goods transport module and the goods information of the to-be-picked goods. In a preferred embodiment of the present invention, the information feedback module includes an Infrared sensor. When the goods transport module operates normally, the information feedback module clears the goods that has been picked from the goods warehousing data according to the goods picking result Referring to FIG. 2, an automatic warehouse control method of the present invention mainly includes the following steps.

Step S201: goods information is inputted to form goods warehousing data when the goods are loaded into the goods containers.

The goods information includes goods names, model numbers, batch numbers, and the like. In a preferred embodiment of the present invention, a barcode or RFID scanner is used for quickly and conveniently obtaining the goods information. Each of the goods containers of the automatic warehouse has a unique container code. Once the goods are put into a goods container and the goods information are inputted, a correspondence relationship is established between the goods information and the container code, thereby forming the goods warehousing data.

Step S202: the goods warehousing data is stored.

Step S203: goods warehousing data is retrieved according to the information of to-be-picked goods.

Step S204: a goods container containing the to-be-picked goods is transported to the goods-picking location according to a retrieved result.

The automatic warehouse of the present invention includes a rack, a plurality of goods containers supported on the rack for containing goods, and a container driving device. The goods containers are capable of circulation movement on the rack. In a preferred embodiment of the present invention, the container driving device is implemented as a push rod driven by a pneumatic cylinder. The driving device pushes a goods container in contact with the driving device to move, and this goods container when moving in turn pushes a goods container in front of this goods container to move, such that the goods containers are moved circulatingly on the rack.

In particular, the retrieved result includes the container code of the goods container containing the to-be-picked goods and a current distance of the goods container containing the to-be-picked goods to the goods-picking location. In the automatic warehouse of the present invention, movement of the goods containers has a constant speed. Therefore, according to the distance of the goods container containing the to-be-picked goods to the goods-picking location, a time T needed for the goods container containing the to-be-picked goods to move to the goods-picking location can be calculated. In one embodiment, the goods containers move in a stepping manner, with a length of each movement step equal to a length of one container space. As such, the current distance of the goods container containing the to-be-picked goods to the goods-picking location can be determined in terms of the number of the container spaces. Therefore, the number of movement steps needed for the goods container containing the to-be-picked goods to move to the goods-picking location can be determined according to this distance.

When the above retrieved result is received, the work time T of the container driving device or the number of movement steps of the goods container is controlled so as to move the goods container containing the to-be-picked goods to the goods-picking location for allowing the user to pick goods.

The technical solution of embodiments of this invention is easy to implement, has a low cost, and allows one warehouse operator to manage multiple racks at the same time, which can significantly reduce hardware and time cost for warehouse management.

Those described above are merely preferred embodiments of the present invention and should not be used to limit the present invention. Any modifications, equivalent substitutions and improvements made without departing from the spirit and principle of the present invention should be integrated to fall within the scope of the present invention.

The invention claimed is:

1. An automatic warehouse control system comprising:
a goods transport module including a rack, a plurality of goods containers supported on the rack, and a container driving device configured to push the goods containers to move relative to the rack along a circulating path, the container driving device configured to move the goods containers in a stepping manner, with a length of each movement step equal to a length of one container space, the goods containers configured to contain goods therein;
an information input module configured to input goods information to form goods warehousing data when the goods are loaded into the goods containers;
a data storage module configured to store the goods warehousing data; and
a data retrieval module configured to retrieve goods warehousing data and send a retrieved result to a drive control module according to information of to-be-picked goods, the retrieved result indicating one of the goods containers that contains the to-be-picked goods;
wherein the drive control module is configured to control operation of the goods transport module to move all the goods containers as a whole circulatingly relative to the rack in the stepping manner at a constant speed so as to transport the one of the goods containers that contains the to-be-picked goods along the circulating path of the goods containers to a goods-picking location according to the retrieved result, the goods-picking location being a fixed location on the circulating path;
wherein the container driving device is configured to push one of the goods containers in contact with the container driving device to move, and this one goods container when moving is configured to in turn push another goods container in front of this one goods container to move, such that the goods containers are moved circulatingly as a whole on the rack.

2. The automatic warehouse control system of claim 1, wherein the automatic warehouse comprises a plurality of racks, and the drive control module comprises a plurality of switches corresponding to the racks.

3. The automatic warehouse control system of claim 1, wherein the information input module comprises a barcode or RFID scanner.

4. The automatic warehouse control system of claim 1, wherein each of the goods containers has a unique container code, and a correspondence relationship is established between the goods information and the container code.

5. The automatic warehouse control system of claim 1, wherein the drive control module includes a switch, and when the switch is turned on, the container driving device operates to push the containers to move.

6. The automatic warehouse control system of claim 5, wherein a specific process of operation of the drive control module comprises:
determining a container code of the goods container containing the to-be-picked goods and a current distance of the goods container containing the to-be-picked goods to the goods-picking location;
determining a specific time or a specific number of movement steps needed for the goods container containing the to-be-picked goods to move to the goods-picking location according to the distance; and
turning on the switch, and after a lapse of the specific time or the specific number of movement steps, turning off the switch.

7. An automatic warehouse control method, the automatic warehouse including a rack, a plurality of goods containers supported on the rack, and a container driving device configured to push the goods containers to move relative to the rack along a circulating path, the container driving device configured to move the goods containers in a stepping manner, with a length of each movement step equal to a length of one container space, the goods containers configured to contain goods therein, the automatic warehouse control method comprising the following steps:
step a: inputting goods information to form goods warehousing data when the goods are loaded into goods containers;
step b: storing the goods warehousing data;
step c: retrieving goods warehousing data according to information of to-be-picked goods;
step d: moving all the goods containers as a whole circulatingly relative to the rack in the stepping manner at a constant speed so as to transport one of the goods containers that contains the to-be-picked goods to a goods-picking location according to a retrieved result, the goods-picking location being located on the circulating path of the goods containers;
wherein the container driving device is configured to push one of the goods containers in contact with the container driving device to move, and this one goods container when moving is configured to in turn push another goods container in front of this one goods container to move, such that the goods containers are moved circulatingly as a whole on the rack.

8. The automatic warehouse control method of claim 7, wherein the step d further comprises:
- determining a container code of the goods container containing the to-be-picked goods and a current distance of the goods container containing the to-be-picked goods to the goods-picking location;
- determining a specific time or a specific number of movement steps needed for the goods container containing the to-be-picked goods to move to the goods-picking location according to the distance;
- switching on the container driving device such that the container driving device pushes one goods container in contact with the container driving device to move, and this goods container when moving in turn pushes one goods container in front of this goods container to move, such that the goods containers are moved circulatingly as a whole relative to the rack along the circulating path; and
- switching off the container driving device after a lapse of the specific time or the specific number of movement steps.

* * * * *